W. J. PUTNAM.
TIRE CHAIN AND ARMOR.
APPLICATION FILED MAR. 31, 1916.
1,259,776.
Patented Mar. 19, 1918.
2 SHEETS—SHEET 1.
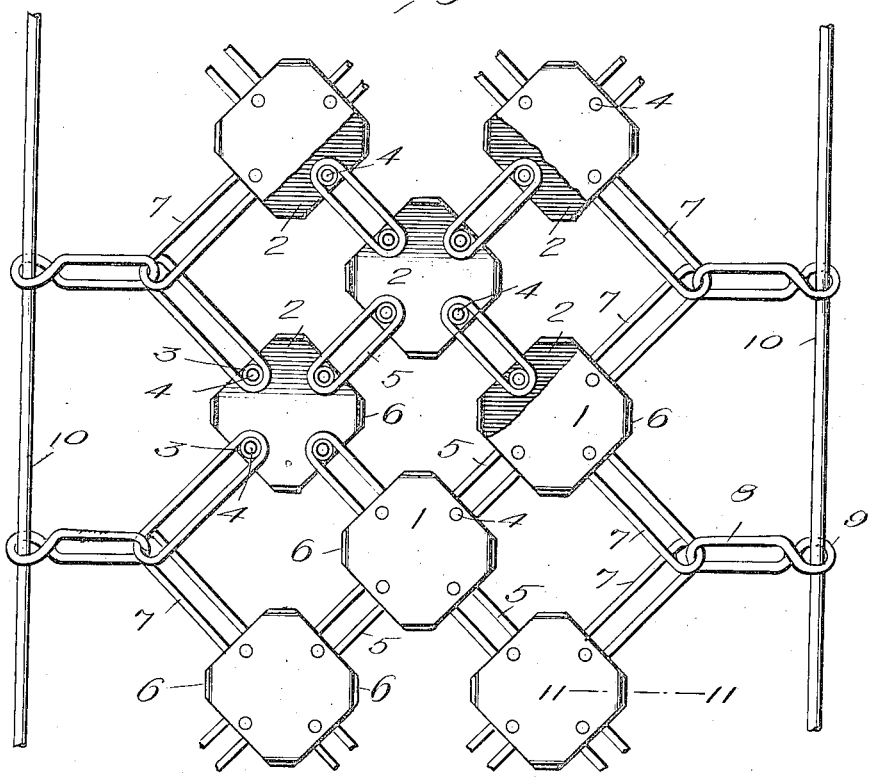
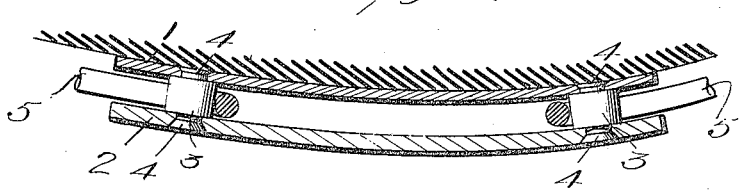
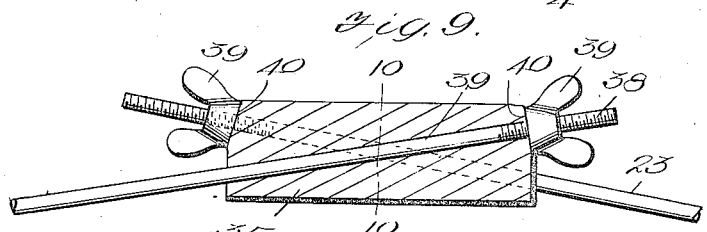
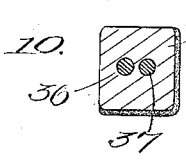
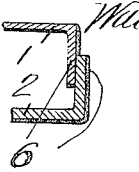
INVENTOR
Walter J. Putnam
BY
ATTORNEYS
WITNESSES:

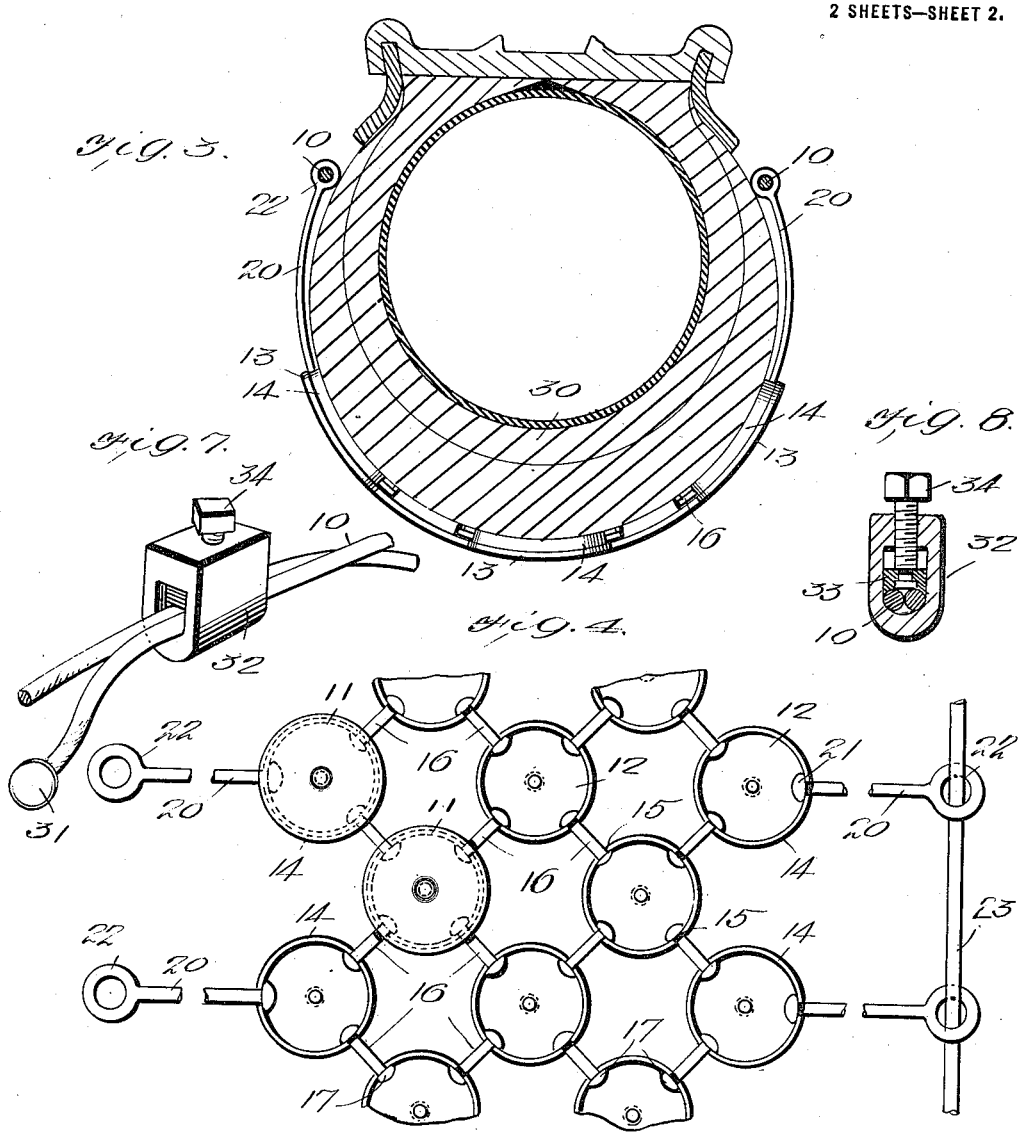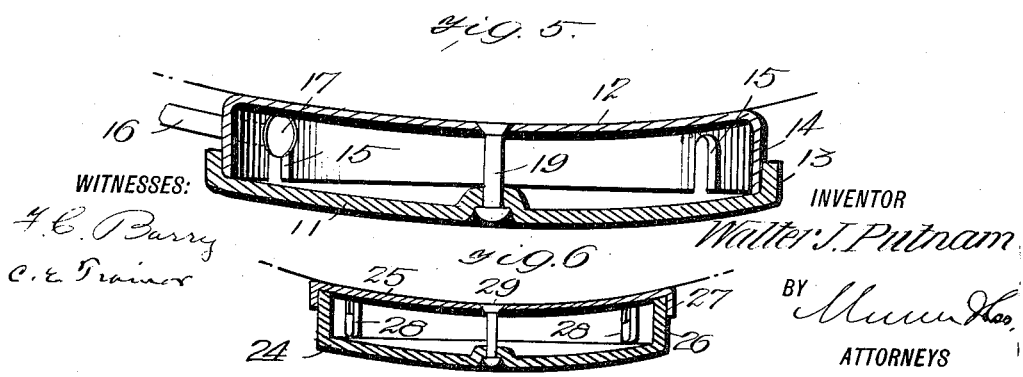

UNITED STATES PATENT OFFICE.

WALTER J. PUTNAM, OF DEPOSIT, NEW YORK.

TIRE CHAIN AND ARMOR.

1,259,776.  Specification of Letters Patent.  Patented Mar. 19, 1918.

Application filed March 31, 1916.  Serial No. 88,015.

*To all whom it may concern:*

Be it known that I, WALTER J. PUTNAM, a citizen of the United States, and a resident of Deposit, in the county of Broome and State of New York, have invented a new and useful Improvement in Tire Chains and Armor, of which the following is a specification.

My invention is an improvement in tire chains and armor, and has for its object to provide a device of the character specified, adapted for use with tires of any character for preventing skidding and slipping and for increasing the traction of the wheels, wherein a series of similar connecting or non-skid members is provided, each consisting of superposed spaced plates having means for engagement by the links for connecting the plates to each other.

A further object is to provide a new and improved method of clamping the holding rings for the armor on to the tire.

In the drawings:—

Figure 1 is a plan view of a portion of the device partly broken away,

Fig. 2 is an enlarged section of one of the non-skid members,

Fig. 3 is a transverse section of a tire provided with the improved armor,

Fig. 4 is a plan view of a portion of another embodiment partly broken away.

Fig. 5 is an enlarged section through one of the non-skid members shown in Fig. 4, Fig. 6 is a similar view of a modified construction, Fig. 7 is a perspective view of one embodiment of clamping device for the holding ring, Fig. 8 is a transverse section through the clamp shown in Fig. 7, Fig. 9 is a longitudinal section of another embodiment of clamp, Fig. 10 is a section on the line 10—10 of Fig. 9, and Fig. 11 is a detail sectional view on the line 11—11 of Fig. 1.

In the embodiment of the invention shown in Figs. 1 and 2, the armor is composed of a series of non-skid members, each consisting of plates 1 and 2 of sheet metal stamped to shape and slightly concavo-convex as shown, the plates of each member being similarly arranged. These plates are square or approximately so, and each plate is provided with four openings, the openings of one plate registering with the openings of the other.

Rivets 3 are provided for connecting the plates, the rivets having their ends reduced as shown at 4 to enter the openings of the plates, and these openings are tapering or flaring as shown, in order that the reduced ends of the rivets may be headed to hold the plates together. The bodies of the rivets 3 provide engaging means for the links 5 which connect the non-skid members, the said links being loops whose ends engage adjacent rivets of adjacent non-skid members.

As shown in Fig. 11, the corners of the plates 1 and 2 are bent toward each other as indicated at 6, and the said ends lap as shown. The bending of the corners is to prevent injury to the casing of the tire from the sharp corners.

As will be seen from an inspection of Fig. 1, the non-skid members are arranged as shown in Fig. 1, in series of three diagonally of the plane of the wheel. The adjacent sides of the members are connected by the links 5, and slightly longer but similar links 7 are connected with the outer sides of the members, the links 7 from adjacent members being connected to a common holding link 8, which has an eye 9 at its outer end for engaging the adjacent retaining ring 10.

The retaining rings are passed through the eyes, and it will be noticed that the eyes are formed by twisting the ends of the links 8. By this arrangement, there is a considerable degree of adjustment permitted, that is, the armor may be widened or narrowed for casings of different sizes. It will be noticed from an inspection of Fig. 2 that the plates 1 and 2 of each non-skid member are spaced apart a greater distance than the diameter of the material forming the links 5 and 7, in order that there may be some play of the links with respect to the non-skid members, thus increasing the flexibility of the armor.

In the embodiment of the invention shown in Figs. 3 and 4, each of the non-skid members is circular, formed from upper and lower circular plates 11 and 12, and each of the plates 11 and 12 is provided with a flange, shown at 13 and 14, respectively, extending laterally from the plate, and the plates are of such diameter that the flange 14 will fit within the flange 13 and the said flange 14 will space the plates 11 and 12 from each other.

The flange 14 is notched or recessed at intervals as indicated at 15 for receiving the connecting links 16 and the said links are of approximately dumb-bell shape, each having a head 17 at each of its ends. The links are of a size to engage loosely in the notches or recesses 15, and the heads are of a size to prevent disengagement of the said links from the notches or recesses.

Each pair of plates is held together by a central rivet 19, and the heads of the rivet are counter-sunk as shown. The plates are arranged in the same manner as the plates of the embodiment shown in Fig. 1, and at the outer sides of the armor links 20 are provided, the said links having heads 21 at their inner ends similar to the heads 17 of the links 16 and eyes 22 at their outer ends for engaging the retaining rings 23. The rings are passed through the eyes, and since there is a considerable degree of play between the bodies of the links and the notches or recesses 15 the armor is flexible and capable of a considerable degree of adjustment.

In the embodiment of the invention shown in Fig. 6, the plates 24 and 25 are provided with lateral flanges at their margins as indicated at 26 and 27, and the flange 26 of the outer plate fits within the flange 27 of the inner plate and is of a depth to space the plates 24 and 25 the proper distance. The flange 26 has notches or recesses 28, similar to the notches or recesses 15 and for the same purpose, and the plates are held together by a rivet 29, having its heads countersunk in the same manner as the rivets 19. The only difference between the non-skid members shown in Fig. 6 and those shown in Fig. 5 is in the manner of flanging, and it will be noticed that in each member the outer plate, namely, the plate 11 of Fig. 5 and the plate 24 of Fig. 6 is slightly heavier than the inner plate, that is, is of greater thickness.

The improved armor is arranged on the tire 30 as shown in Fig. 3, the plates of each armor having a sufficient aggregate width to cover the tread of the tire, and the links 8 or 20 extend along the sides of the tire to their engagement with the retaining rings 10 or 23.

In Figs. 7 to 10, inclusive, are shown clamps for connecting the ends of the retaining rings. These rings are preferably wire cables, and in Fig. 7 one end of the cables 10 has a knot or enlargement 31. The cables are engaged with the longitudinal passage of a clamp body 32, the said ends lying alongside each other in the bottom of the passage which is U-shaped, that is, the said bottom is concave so that the ends will lie alongside each other, and will be forced tightly together when they are forced downward into the bottom of the passage.

A clamping plate 33 is provided for cooperating with the body of the clamp, and this plate is rotatably connected with the screw 34, which is threaded through the top of the clamp. When the screw is turned in the proper direction the clamping plate 33 will be forced tightly down upon the ends of the cable and the ends themselves will be forced into the concave portion of the passage, and will be forced tightly against each other. The engaging face of the clamping plate is also concave as shown. The roughness of the ends will cause enough friction to absolutely prevent any slipping when they are forced tightly together into the concave bottom of the passage.

With this construction, when the armor is placed, the ends of the retaining rings are drawn as tightly as possible, after which the screw is turned slightly to cause sufficient friction between the ends to prevent slipping. If it is then desired to tighten the rings this may be done with a pair of pliers, the operator grasping one end of the ring tightly and the other end loosely in such manner that the knot or enlargement 31 of the said last-named end will bear against the side of the pliers. The operator then by means of the pliers may exert sufficient leverage to tighten the rings to any desired degree and when tightened the screw 34 is turned down to clamp the ends together.

In the embodiment of the clamp shown in Figs. 9 and 10, a bar 35 is provided having openings 36 and 37 through which the ends of the retaining ring 23 are passed. These passages extend longitudinally of the block but are inclined in opposite directions as shown, and each end of the ring is threaded as shown at 38. A wing nut 39 is engaged with each threaded end, and it will be obvious that when the nuts are turned in the proper direction the ends may be drawn in opposite directions to tighten the ring. The ends of the non-skid members are beveled as shown at 40 at the points engaged by the wing nuts, so that the bearing surface is perpendicular to the line of pull. The openings 36 and 37 are straight, so that there is no tendency to bend the threaded ends of the wire, and no tendency to injure the threads.

I claim:—

In tire armor, non-skid members each consisting of similar plates spaced apart and connected to each other, links connecting the members, each link having its ends pivoted to the members, and the means for pivoting the links to the members spacing the members apart.

WALTER J. PUTNAM.